(12) United States Patent
Ryu et al.

(10) Patent No.: US 7,463,606 B2
(45) Date of Patent: Dec. 9, 2008

(54) METHOD FOR ESTABLISHING A MIP AND PERFORMING HANDOFF BY A MOBILE NODE

(75) Inventors: Jae Hong Ryu, Daejeon (KR); Won Ryu, Daejeon (KR); Soon Choul Kim, Daejeon (KR); Dong Won Kim, Daejeon (KR)

(73) Assignees: Electronics and Telecommunications Research Institute (KR); KT Corporation (KR)

( * ) Notice: Subject to any disclaimer, the term of this patent is extended or adjusted under 35 U.S.C. 154(b) by 346 days.

(21) Appl. No.: 11/098,906

(22) Filed: Apr. 4, 2005

(65) Prior Publication Data

US 2005/0226186 A1    Oct. 13, 2005

(30) Foreign Application Priority Data

Apr. 7, 2004    (KR) .................... 10-2004-0023810

(51) Int. Cl.
H04Q 7/00    (2006.01)

(52) U.S. Cl. .................. 370/331; 370/338; 370/389; 370/401; 455/436

(58) Field of Classification Search .......... 370/331, 370/338, 349, 389, 395.1, 401, 328; 455/436, 455/426.1, 432.2, 439, 442; 709/227, 240, 709/245

See application file for complete search history.

(56) References Cited

U.S. PATENT DOCUMENTS

| 6,707,813 | B1* | 3/2004 | Hasan et al. ................. 370/356 |
| 7,079,519 | B2* | 7/2006 | Lee et al. ..................... 370/338 |
| 2002/0068570 | A1 | 6/2002 | Abrol et al. |
| 2003/0139182 | A1* | 7/2003 | Bakkeby et al. ............. 455/432 |
| 2004/0028022 | A1* | 2/2004 | Teal et al. .................... 370/345 |
| 2004/0131023 | A1* | 7/2004 | Auterinen .................... 370/328 |
| 2004/0229596 | A1* | 11/2004 | Stura et al. .................. 455/406 |
| 2004/0243720 | A1* | 12/2004 | Haumont et al. ............ 709/245 |

FOREIGN PATENT DOCUMENTS

| KR | 2002-0016892 | 3/2002 |
| KR | P2002-0015983 | 3/2002 |
| KR | 1020040071113 | 11/2004 |

* cited by examiner

Primary Examiner—Matthew Anderson
Assistant Examiner—Shaima Q Aminzay
(74) Attorney, Agent, or Firm—Blakely, Sokoloff, Taylor & Zafman (57) ABSTRACT

A method for supporting handoff and preventing data loss in mobile communications networks is provided. The method for a mobile node establishing a mobile Internet protocol (MIP) with at least one or more wireless packet service systems, each of which has a serving GPRS support node (SGSN) and a gateway GPRS support node (GGSN), includes: a first SGSN connected to the mobile node transmitting predetermined first connection information on the mobile node to at least one or more second SGSNs adjacent to the first SGSN; the second SGSN receiving the first connection information storing the first connection information as a database item, and transmitting 1 first connection acknowledgement message to the first SGSN; if reception of the connection acknowledgement message is successful, the first GGSN connected to the first SGSN transmitting predetermined second connection information on the mobile node to at least one or more second GGSNs connected to the second SGSN; and the second GGSN receiving the second connection information and then transmitting a second connection acknowledgement message to the second GGSN. By transmitting information on a mobile node required for handoff to adjacent foreign agents (FAs) in advance, when handoff is performed, reliable handoff can be performed quickly without resetting and releasing a PPP, such that IP mobility services can be provided.

10 Claims, 6 Drawing Sheets

METHOD FOR ESTABLISHING A MIP AND PERFORMING HANDOFF BY A MOBILE NODE

BACKGROUND OF THE INVENTION

This application claims the priority of Korean Patent Application No. 10-2004-0023810, filed on Apr. 7 2004, in the Korean Intellectual Property Office, the disclosure of which is incorporated herein in its entirety by reference.

1. Field of the Invention

The present invention relates to a method to support handoff of a mobile node, and more particularly, to a method for supporting fast handoff between packet matching apparatuses in a mobile communications network and preventing data loss that can occur in the supporting process.

2. Description of the Related Art

Conventional handoff between packet matching apparatuses means a case where a mobile node moves into the area of another packet matching apparatus. In this case, care of address (CoA) changes and the Internet protocol (IP) of the mobile node should be newly set. For this, by using a foreign agent (FA) function of a packet matching apparatus, an IP should be reassigned to the mobile node and the mobile node should be registered in the new FA so that the mobile can move. That is, in a state where a mobile node is registered for a mobile Internet protocol (MIP) in a packet matching apparatus, when the mobile node moves to another packet control function (PCF) of the packet matching apparatus, the PCF tracks the mobility of the mobile node. A packet transmitted to the mobile node by an IP network is transferred to the corresponding packet matching apparatus through a home agent (HA) according to the IP address of the mobile node, and the packet matching apparatus transfers the new packet to the PCF through a radio and packet (R-P) interface and the PCF again transfers the packet to the mobile node.

However, when the mobile node moves into another packet matching apparatus area, the mobile nodes registers for an MIP in the new packet matching apparatus. This is to indicate the movement of its IP address to the new packet matching apparatus. In this case, since a new FA is registered in the HA, an IP packet transmitted to the mobile node is transferred from the HA to the new packet matching apparatus, and then transferred to the mobile node. Here, arises a problem that loss of user packets occurring during a delay time due to this point-to-point protocol (PPP) re-registration cannot be prevented.

That is, generally, a connection point corresponding to the PPP of a terminal is a packet matching apparatus, and since the terminal has moved into a new packet matching apparatus, a procedure resetting a PPP session should be performed to obtain a new PPP connection point.

Under this situation, it is needed that handoff between packet matching apparatuses is performed quickly without performing unnecessary resetting of a PPP that can occur in handoff between packet matching apparatuses.

SUMMARY OF THE INVENTION

The present invention provides a method for providing faster and safer handoff when handoff occurs, in which in registering a care of address (CoA) of a mobile node in a home agent (HA) and providing IP mobility services when a foreign agent is changed due to movement of the mobile node under an environment complying with IP Mobility (RFC2002) of the Internet Engineering Task Force (IETF) to provide IP mobility service to a mobile node, adjacent foreign agents (FAs) are regarded as candidate FAs, where handoff of the mobile node can be performed, and information on mobile nodes managed by respective FAs is shared in advance such that when handoff occur, faster and safer handoff can be provided.

According to an aspect of the present invention, there is provided a method for a mobile node establishing a mobile Internet protocol (MIP) with at least one or more wireless packet service systems, each of which has a serving GPRS support node (SGSN) and a gateway GPRS support node (GGSN), including: a first SGSN connected to the mobile node transmitting predetermined first connection information on the mobile node to at least one or more second SGSNs adjacent to the first SGSN; the second SGSN receiving the first connection information storing the first connection information as a database item, and transmitting 1 first connection acknowledgement message to the first SGSN; if reception of the connection acknowledgement message is successful, the first GGSN connected to the first SGSN transmitting predetermined second connection information on the mobile node to at least one or more second GGSNs connected to the second SGSN; and the second GGSN receiving the second connection information and then transmitting a second connection acknowledgement message to the second GGSN.

According to another aspect of the present invention, there is provided a method for performing handoff by a mobile node between wireless packet services systems each of which has an SGSN and a GGSN, the method including: sharing information on the mobile node by a first wireless packet service system to which the mobile node is connected and at least one or more second wireless packet service systems adjacent to the first wireless packet service system; a first SGSN sensing movement of the mobile node requesting host to update a location; terminating a GTP tunnel between a first GGSN and the first SGSN and forming a GTP tunnel between a second GGSN and a second SGSN; and transmitting and receiving data between the second GGSN and the mobile node.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
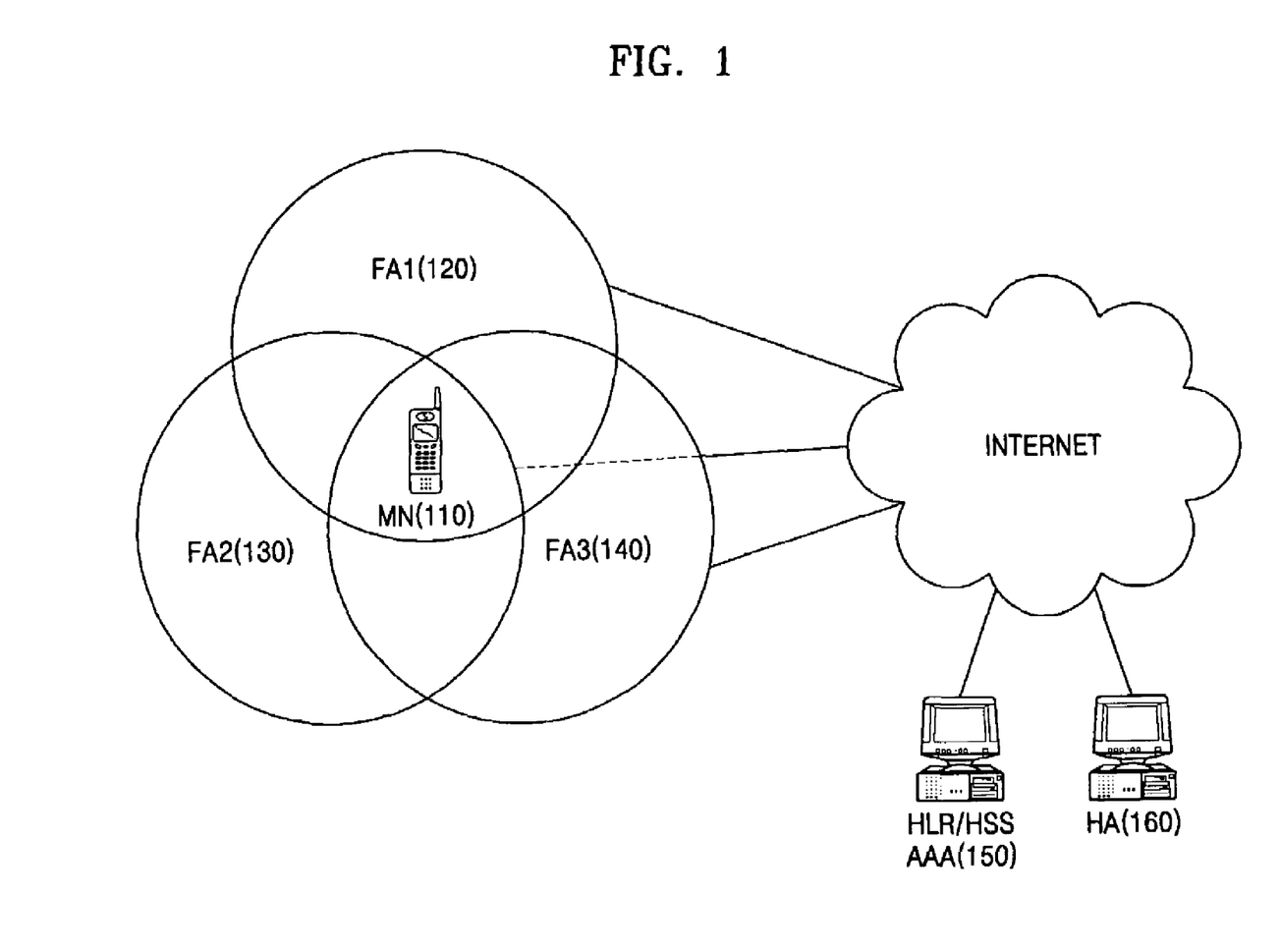
FIG. 1 is a conceptual diagram of the structure of an entire network guaranteeing mobility of a mobile node.

The present invention will now be described more fully with reference to the accompanying drawings, in which exemplary embodiments of the invention are shown. A conceptual diagram of the structure of an entire network guaranteeing mobility of a mobile node is shown in FIG. 1. Referring to FIG. 1, the outline of the structure will now be explained.

First, if a mobile node 110 is connected first to FA1 120, FA1 120 assigns a session to the mobile node 110 through general packet radio service (GPRS) tunneling protocols (GTP). Then, by an IP address allocation method such as a point-to-point protocol/dynamic host configuration protocol (PPP/DHCP), an IP address is allocated to the mobile node 110.

In the IP address allocation process, FA1 120 receives information on adjacent FAs 130 and 140, which the mobile node 110 can access, transmitted by a home location register/home subscriber system (HLR/HSS) 150, and transmits the setting state of the mobile node 110, related calls, and session information to the FAs 130 and 140. Here, the HLR/HSS 150 is located at the home network of the subscriber and is a kind of database connected to AAA through Wx interface.

The FAs 130 and 140 receiving the information become to recognize the mobile node 110 as a subscriber that can be connected, that is, handed off, any time to the FAs 130 and 140. Under this condition, if the HLF/HSS 150 senses the movement of the subscriber, a movement related message is transmitted to the corresponding FA 130 or 140. The FA 130 or 140 receiving the message can provide data services directly by using the message transmitted by the previous FA 120, without a GTP/PPP connection for accessing mobile nodes. At the same time, the FA 130 or 140 transmits an advertisement message to the mobile node 110 to indicate that the FA 130 or 140 is connected to the mobile node 110.

Figure 2:
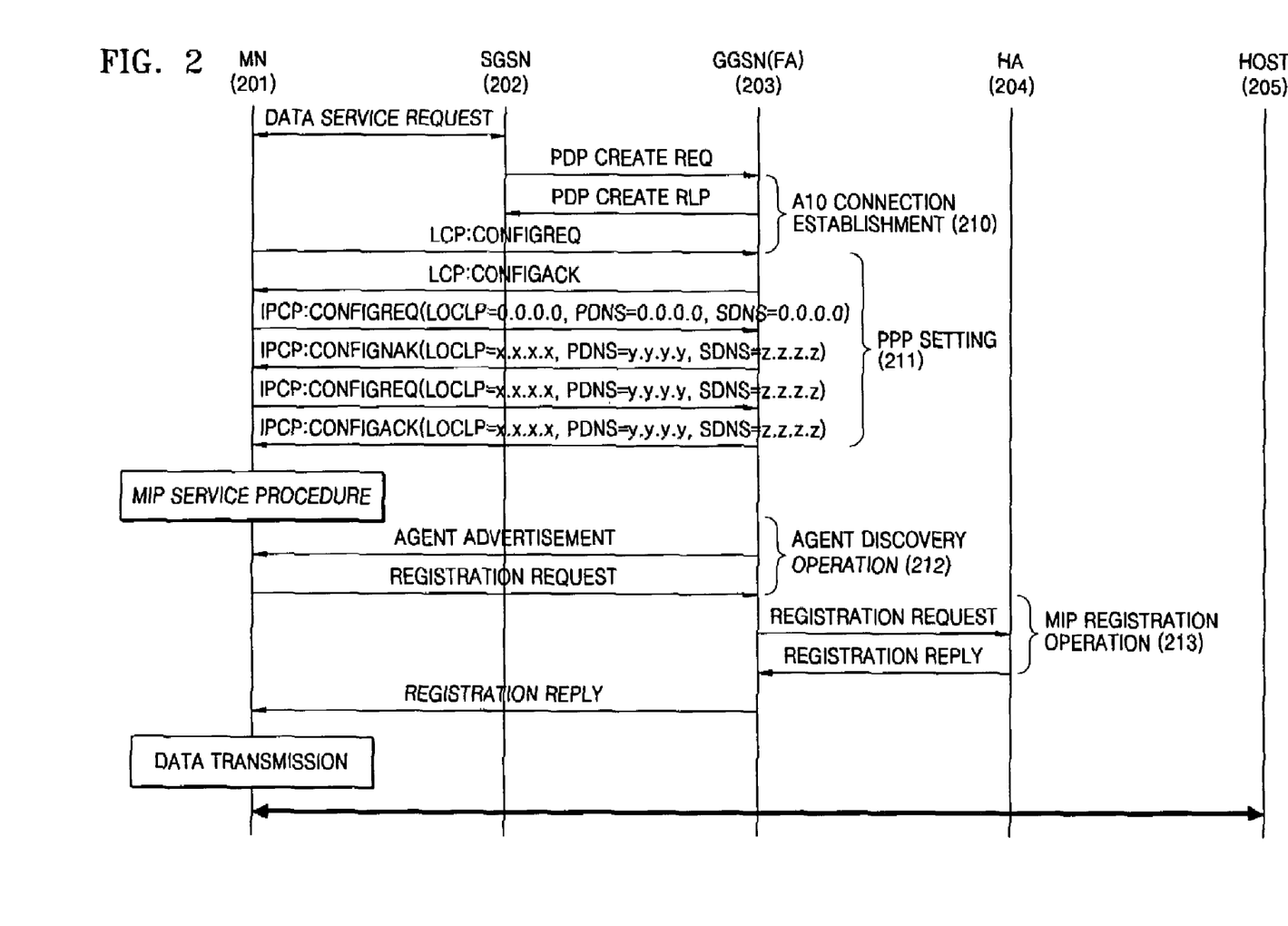
FIG. 2 is a diagram showing flow of signals to set a mobile Internet protocol (MIP) at a mobile node.

Referring to FIG. 2, flow of signals to set a mobile Internet protocol (MIP) at a mobile node will now be explained. When a mobile node 201 is first connecting a call, the mobile node 201 transfers a transmission message including a data service request, to a serving GPRS support node 202 (hereinafter referred to as a "SGSN"). The SGSN 202 has a hardware structure providing a switching and routing connection for GPRS service and performs functions for processing a variety of data services. The functions include a GPRS mobility management function, a GPRS session management function, and a GPRS authentication and charging function.

The SGSN 202 receiving the message transmits this information to a gateway GPRS support node 203 (hereinafter referred to as a "GGSN") to establish an RP connection in operation 210, and performs a PPP connection establishing procedure in operation 211. Here, the RP connection indicates an interface connection for signaling A11 between the SGSN 202 and the GGSN 203 and user traffic A10. The GGSN 203 is a service node of an IP based packet network providing a high speed packet data service for data services of the GPRS, and performs functions to provide mobility of packet data services and processing a variety of data related protocols. The GGSN 203 performs functions for allocating addresses, translating domain addresses, charging, and maintaining and repairing information. Also, the GGSN 203 performs a foreign agent (FA) function in an MIP and a network access server (NAS) function setting up a PPP with a terminal.

At this time, the mobile node 201 is allocated its address by the GGSN 203 and completes the PPP setting in operation 211, and the GGSN 203 transmits an advertisement message to the mobile node 201 periodically. Through this message, the mobile node 201 can confirm its current Internet connection point.

Meanwhile, if the mobile reads this advertisement message and transmits a mobile IP registration request (MIP RRQ) to the GGSN 203 in operation 212, the GGSN 203 and the HA 204 checks whether or not the subscriber falls within a subscriber that the MIP can support and then perform authentication. If the subscriber is the one that cannot be authenticated, the GGSN 203 includes an error into a mobile IP registration reply (MIP RPL) code, transmits the code to the mobile node 201 and releases the call. However, if the subscriber is the one that can perform the MIP normally, the GGSN 203 keeps visitor information and informs the mobile node 201 of it, and by doing so, the registration procedure is finished in operation 213. If thus the PPP is set and the call connection is effectively established, actual data communication between the mobile node 201 and the host 205 is performed.

Figure 3:
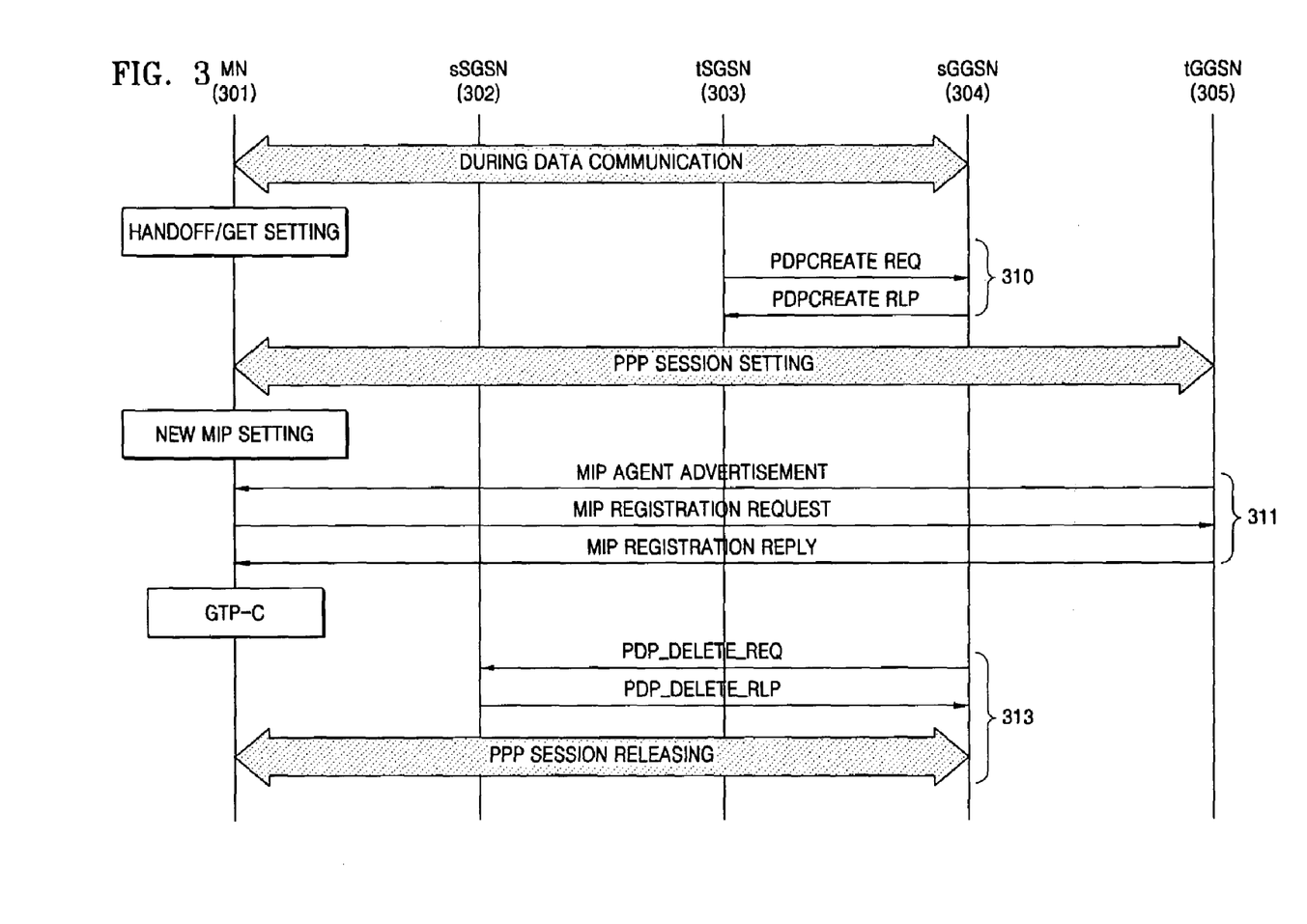
FIG. 3 is a diagram showing flow of signals to support handoff of a mobile node.

Referring to FIG. 3, a handoff performing process of the mobile node 301 will now be explained. At present, a mobile node 301 connected to the Internet through a source SGSN (sSGSN) 302 and a source GGSN (sGGSN) 304 is receiving data services. Here, the sSGSN 302 and the sGGSN 304 indicate the SGSN and GGSN, respectively, of a wireless packet service network to which the mobile node 301 is currently connected, and expressed as a first SGSN and a second GGSN, respectively, in the appended claims. If the subscriber, that is, the mobile node 301, moves, a PPP should be set with the mobile node 301 through message exchange with a target SGSN (tSGSN) 303 and a target GGSN (tGGSN) 305. For this, the tSGSN 304 transmits a PDP creation request message (PDPCreate REQ) to the tGGSN 305, and in response to this, the tGGSN 305 transmits a PDP creation reply message (PDPCreate RLP) to the tSGSN 303. By doing so, a PPP session between the mobile node 301 and the tGGSN 305 is set in operation 310.

If this process is successful, a PPP session is reset between the mobile node 301 and the tGGSN 305. After that, the tGGSN 305 transmits an MIP advertisement message to the mobile node 301 and in response, the mobile node 301 transmits an MIP registration request to the tGGSN 305. In response to this, the tGGSN 305 again transmits an MIP registration reply to the mobile node 305 such that a new MIP is set in operation 311. Then, by transmitting and receiving a PDP delete request and a response message between the sSGSN 302 and the sGGSN 304, the previous PPP session is released in operation 313.

Thus, when handoff is performed, a process for setting a new PPP session and releasing the existing PPP session is needed and therefore, there is a possibility that time and resources are wasted unnecessarily. A preferred embodiment of the present invention to remove the possibility will now be explained with reference to FIGS. 4 through 6.

Figure 4:
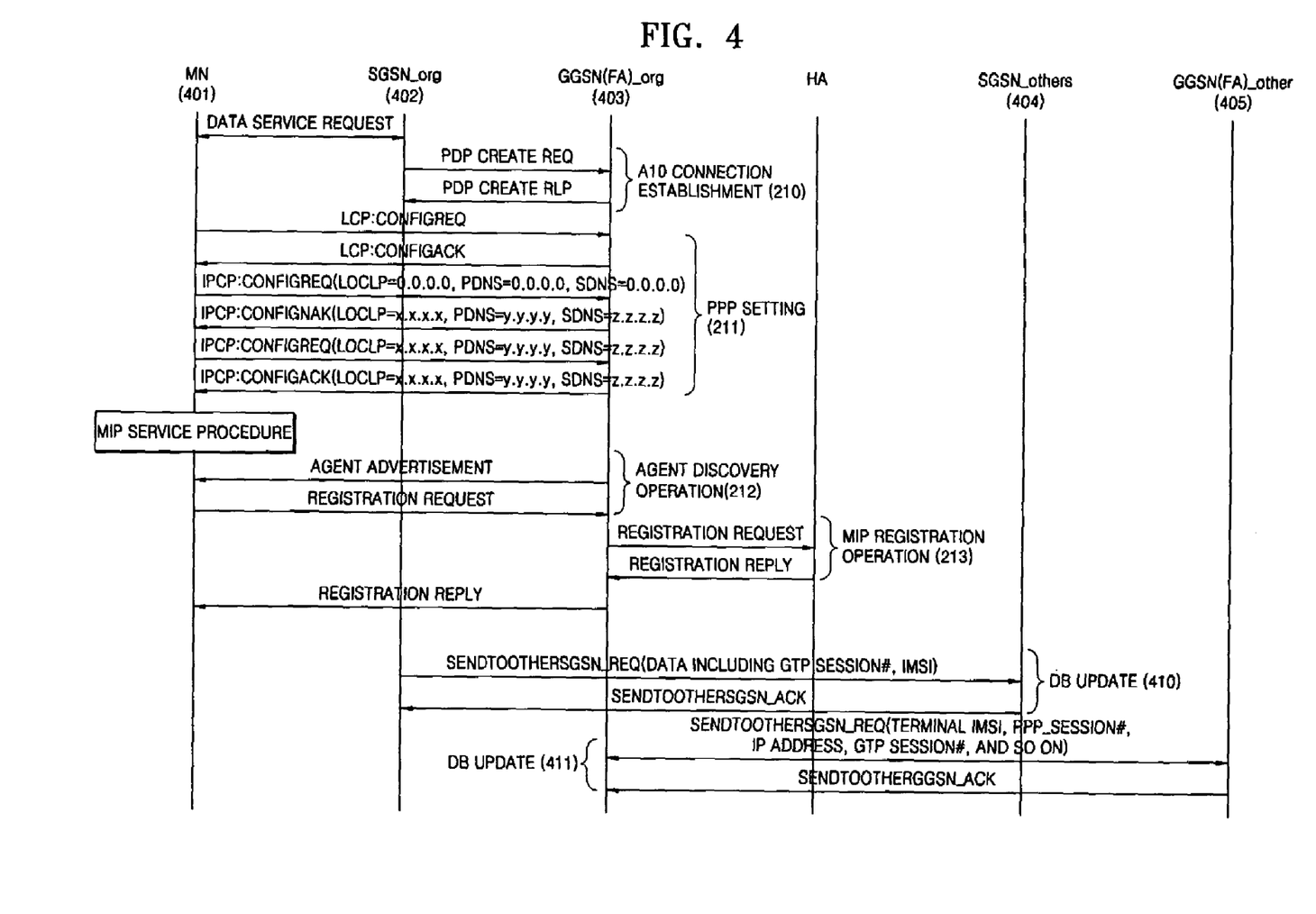
FIG. 4 is a diagram showing flow of signals among network elements in a process setting an MIP according to the present invention.
Figure 5:
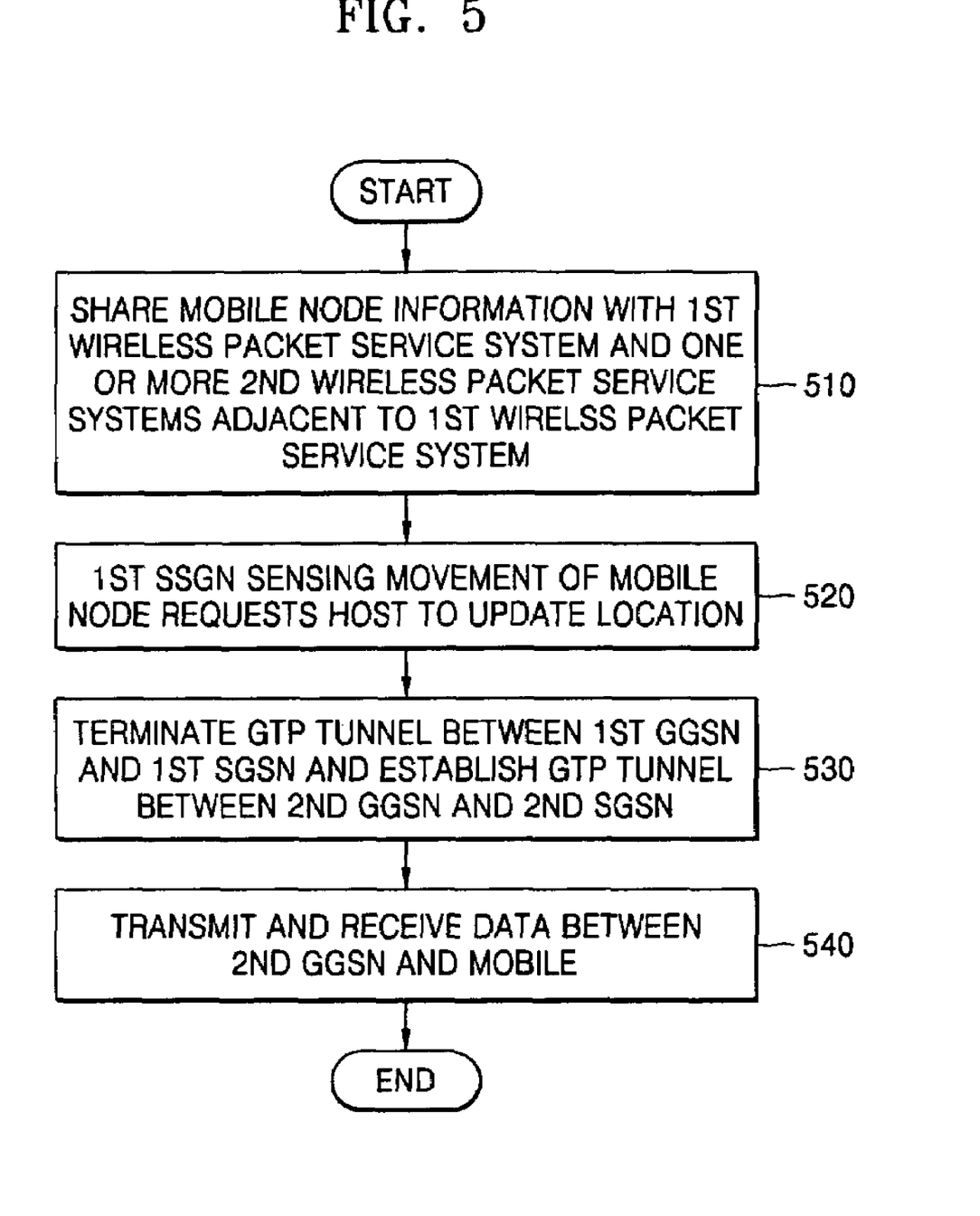
FIG. 5 is a flowchart of the operations performed in a process supporting handoff and preventing data loss in a mobile node according to the present invention.
Figure 6:
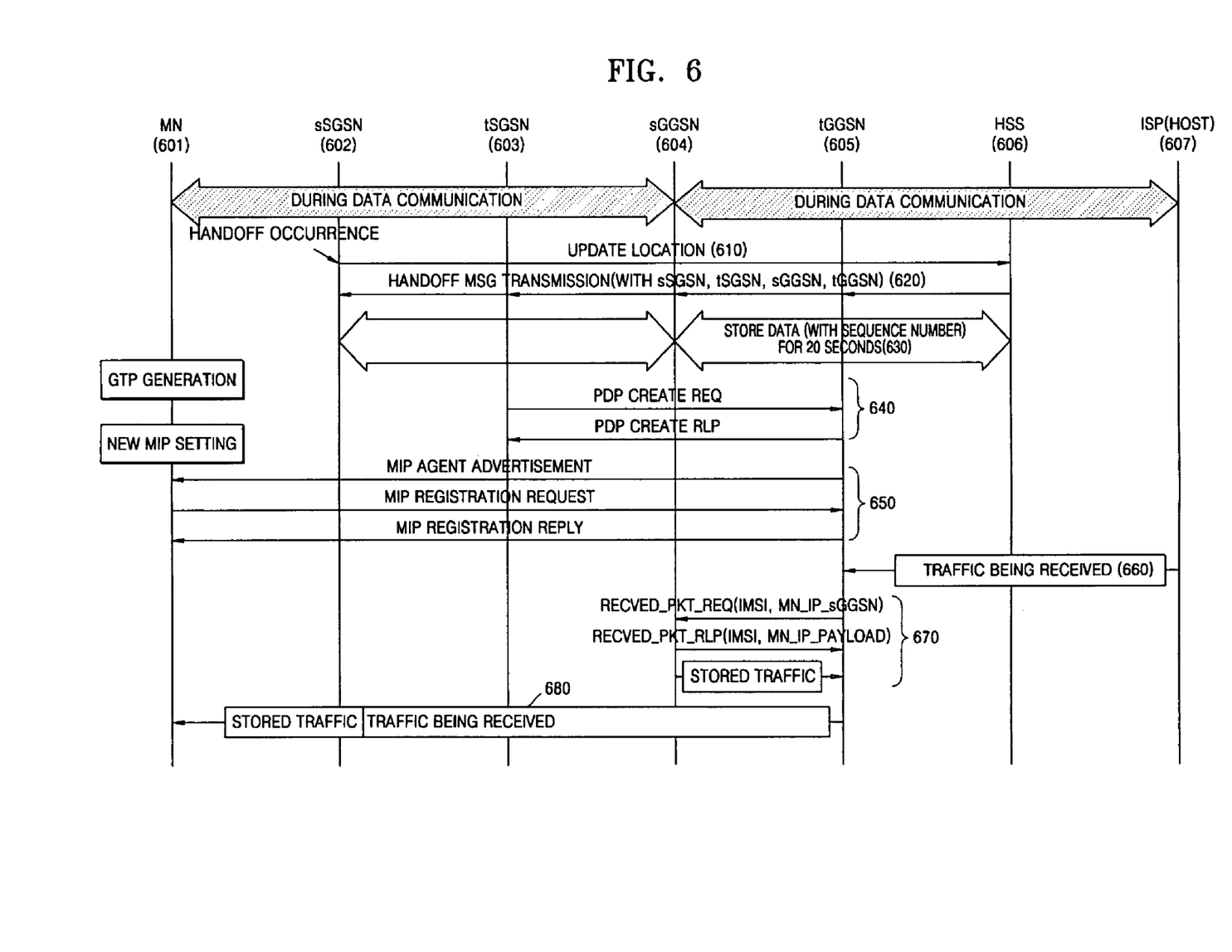
FIG. 6 is a diagram showing flow of signal among network elements to perform the process of FIG. 5 in more detail.

FIG. 4 is a diagram showing flow of signals among network elements in a process setting an MIP according to the present invention, FIG. 5 is a flowchart of the operations performed in a process supporting handoff and preventing data loss in a mobile node according to the present invention, and FIG. 6 is a diagram showing flow of signal among network elements to perform the process of FIG. 5 in more detail.

First, referring to FIG. 4, a process for registering an MIP will now be explained. Assuming that a wireless packet service system from which a mobile node currently receives data services is referred to as a firs wireless packet service system and an adjacent wireless packet service system, that is, FA2 or FA3 in FIG. 1, is referred to as a second wireless packet service system, each wireless packet service system includes an SGSN and a GGSN.

First, the operation for a mobile node 401 trying to connect a call to the first SGSN 402 to the MIP registration, that is, operations 210 through 213, are explained above with reference to FIG. 2, and the explanation will be omitted here. Now, a first SGSN 402 to which the mobile node 401 has been connected transmits first connection information, including the International mobile subscriber identity (IMSI) and GTP session number of the node, to a second SGSN 404 that is another SGSN adjacent to the first SGSN 402. The second SGSN 404 receiving this first connection information stores the information in a database and transmits an ACK signal back to the first SGSN 402 in operation 410.

If the connection acknowledgement message is successfully received, a first GGSN 402 connected to the first SGSN 402 transmits second connection information, including the IMSI, PPP session number, IP address, and GTP session number of the mobile node 401, to a second GGSN 405 connected to the second SGSN 404. The second GGSN 405 receiving the second connection information stores the second connection information in a database and then transmits an ACK message to the first GGSN 403 in operation 411. By doing so, preparation for MIP registration when the mobile node 401 moves into the second wireless packet service system is finished.

An embodiment of a process for performing handoff during data service will now be explained with reference to FIGS. 5 and 6. First, a process (operation 510) for sharing information of a mobile node 601 by each wireless packet service system is needed. Since the process is described above with reference to FIG. 4, the explanation will be omitted here. In this situation, if the mobile node 601 moves, a first SGSN 602 sensing the movement requests the host 606 to update the location in operation 520. According to the request, the host transmits a handoff message to each element devices of the network, and according to this, there will be data storage between a first SGSN 602 and a second SGSN 603, and between a first GGSN 604 and a second GGSN 605, which will be explained later. Also, a GTP tunnel is formed between the second GGSN 603 and the second SGSN 604 in operation 530, and data is exchanged between the second GGSN 605 and the mobile node 601 in operation 540.

Referring to FIG. 6, flow of signals will now be explained in more detail. First, if handoff occurs during service, the first SGSN 602 senses the handoff and transmits a location update message to the HSS 606 in operation 610. The HSS 606 updates location information and transmits a handoff message to related GGSNs (that is, first and second GGSNs) and SGSNs (that is, first and second SGSNs) in operation 620.

The previous tunnel between the first GGSN 604 and the first SGSN 602 is terminated and a GTP tunnel is formed between the second GGSN 605 and the second SGSN 604 with new PDP creation messages being exchanged in operation 640. At this time, PPP generation is not required to be performed newly, and since according to the method described with reference to FIG. 4, connection information of the mobile node 601 is exchanged between adjacent GGSNs and known, this information is used without change. Accordingly, a PPP resetting procedure is not needed. During that time, the first GGSN 604 stores data traffic being transmitted without knowing the location change, for 20 seconds in operation 630.

If the GTP generation is finished, a new MIP is set in operation 650, and after that, data traffic is transferred to the second GGSN 605. The second GGSN 605 requests the first GGSN 604 to transfer the data traffic buffered and stored by the first GGSN 604 in operation 670, and after arranging in order sequence numbers of traffic received from the first GGSN 604 and from the host 607, transmits the traffic to the mobile node 601. That is, the second GGSN 605 continuously stores data transmitted during the movement, and if the movement is completed, compares the sequence number with that of data transmitted by the first GGGSN 604, combines data to the matching point, and transmits the data to the mobile node in operation 680. Here, for data transmission between GGSNs, port 10024 of IP/UDP can be used.

An embodiment to prevent data loss that can occur during handoff will now be explained. In the handoff by movement of a mobile node in mobile communications, what matters is download by which data is transmitted from a network to a mobile and the others do not matter.

When data is transmitted to a mobile node from a network, tunnelling occurs in an FA (corresponding to a CoA) through which data is transmitted, and the data is transmitted to a base station and transmitted to the mobile node. However, if the mobile node moves into another FA, the route through which the previous FA transmits traffic data to the mobile node is disconnected and data loss occurs.

Accordingly, in order to prevent the data loss, if an FA to which the mobile node is currently connected always has a function to store data for 20 seconds or more, when movement of the mobile node is indicated by the HLR/HSS and there is a request for transmitting data received from the second GGSN 605, traffic data stored previously is UDP transmitted to the FA into which the mobile node moves. At this time, the reason for storing data for 20 seconds is that the maximum time taken for movement determined in a recommendation draft is 20 seconds.

Now, if the FA being visited, that is, the second wireless packet service system, receives the traffic data, the FA does not need to perform the connection related procedure described above for the related data, and therefore can transmit traffic data directly to the mobile node.

Also, in order to guarantee the safety and consistency of traffic data in the mobile node and the FA, if a download counter is disposed between an HA and an FA, even when the mobile node moves with a received message number, whether or not the received message is received once more due to the movement can be checked and whether or not there is data loss due to the movement can be verified.

The method for supporting handoff and preventing data loss according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, a font ROM data structure according to the present invention can also be embodied as computer readable codes on a computer readable recording medium such as ROM, RAM, CD-ROMs, magnetic tapes, floppy disks, and optical data storage devices.

The method for supporting handoff and preventing data loss according to the present invention described above is not limited to the explanation and attached drawings for the embodiments described above, and it will be understood by those of ordinary skill in the art that various changes in form and details may be made therein without departing from the spirit and scope of the present invention as defined by the following claims.

In the conventional method, handoff to a new FA (nFA) should be sensed by a mobile node, and for MIP registration, such procedures as GTP resetting, PPP resetting should be performed, and the procedures for GTP and PPP release of an old FA (oFA) should be performed.

Unlike the conventional method, according to the method for supporting handoff and preventing data loss according to the present invention, the HLF/HSS informs a current FA (cFA) to which the current mobile node belongs, of information on neighbour candidate FAs and sensing of handoff, and cFA informs in advance neighbour FAs of information on the mobile node required during handoff. By doing so, when handoff occurs, reliable and fast handoff can be performed without a process for PPP resetting and releasing and IP mobility services can be provide. Also, in order to prevent loss of download traffic data by handoff latency, data is buffered for 20 seconds or more in the cFA and then the buffered data is transferred to the nFA through UDP such that data loss can be prevented. At this time, in order to determine whether or not data is lost, a download counter is disposed between the HA and FA to manage sequence numbers and when handoff occurs and FAs are switched, the consistency of the sequence numbers can be checked to identify data loss.

What is claimed is:

1. A method for establishing a mobile Internet protocol (MIP) by a mobile node, the method comprising:
    the mobile node establishing the (MIP) with at least two wireless packet service systems, each of which a serving GPRS support node (SGSN) and a gateway GPRS support node (GGSN), wherein said establishing includes:
    a first SGSN connected to a mobile node transmitting predetermined first connection information on the mobile node to at least one or more second SGSNs adjacent to the first SGSN;
    the second SGSN receiving the first connection information storing the first connection information as a database item, and transmitting first connection acknowledgement message to the first SGSN;
    when reception of the connection acknowledgement message is successful, the first GGSN connected to the first SGSN transmitting predetermined second connection information on the mobile node to at least one or more second GGSNs connected to the second SGSN; and
    the second GGSN receiving the second connection information and then transmitting a second connection acknowledgement message to the second GGSN.

2. The method of claim 1, wherein the transmitting of the predetermined first connection information comprises:
    when the mobile node is connected to the first SGSN, allocating a session and an IP address to the mobile node; and
    the mobile node receiving information on a wireless packet service system available for visiting, from a home location register (HLR) managing the mobile node.

3. The method of claim 1, wherein the first connection information includes a general packet radio service (GPRS) tunneling protocols (GTP) session number, and an International mobile subscriber identity (IMSI) of a mobile node.

4. The method of claim 1, wherein the second connection information includes an International mobile subscriber identity (IMSI), point-to-point protocol (PPP) session number, an IP address, and a GTP session number of the mobile node.

5. A method for performing handoff by a mobile node, the method comprising:
    the mobile node performing handoff between wireless packet services systems each of which has an SGSN and a GGSN, wherein said performing includes:
    sharing information on the mobile node by a first wireless packet service system to which the mobile node is connected and at least one or more second wireless packet service systems adjacent to the first wireless packet service system;
    a first SGSN sensing movement of the mobile node requesting host to update a location;
    terminating a GTP tunnel between a first GGSN and the first SGSN and forming a GTP tunnel between a second GGSN and a second SGSN; and
    transmitting and receiving data between the second GGSN and the mobile node.

6. The method of claim 5, wherein the sharing of the information on the mobile node comprises:
    the first SGSN to which the mobile node is connected, transmitting first connection information of the mobile node to at least one or more second SGSNs adjacent to the first SGSN;
    the second SGSN receiving the first connection information, storing the first connection information in a database and transmitting to the first SGSN; and
    when the reply is successful, the first GGSN connected to the first SGSN, transmitting second connection information of the mobile node to at least one or more second GGSNs connected to the second SGSN.

7. The method of claim 5, wherein the terminating of a GTP tunnel between a first GGSN and the first SGSN and the forming of a GTP tunnel between a second GGSN and a second SGSN further comprises:
    said first SGSN receiving data;
    storing data received by the first SGSN, for a predetermined time.

8. The method of claim 7, wherein the predetermined time is 20 seconds.

9. The method of claim 5, wherein the transmitting and receiving of data between the second GGSN and the mobile node comprises:
    the second GGSN receiving data transmitted to the mobile node;
    the second GGSN requesting the first SGSN to transmit data stored by the first SGSN for a predetermined time among data transmitted to the mobile node, to the second GGSN; and
    transmitting the data transmitted to the mobile node and the stored data together to the mobile node.

10. The method of claim 9, wherein in the transmitting of the data, the sequence numbers of the data transmitted to the mobile node and the stored data are arranged in order and then transmitted.

* * * * *